United States Patent Office 3,436,400
Patented Apr. 1, 1969

3,436,400
AMINOBENZYLATED PHTHALOCYANINES
Harlan B. Freyermuth and David I. Randall, Easton, Pa., assignors to GAF Corporation, a corporation of Delaware
No Drawing. Filed Oct. 22, 1965, Ser. No. 502,412
Int. Cl. C09b 47/04, 62/10
U.S. Cl. 260—314.5          4 Claims

ABSTRACT OF THE DISCLOSURE

A phthalocyanine compound useful as dyestuff and as an intermediate for the production of azo dyestuffs, fiber-reactive dyestuffs and the like having the formula

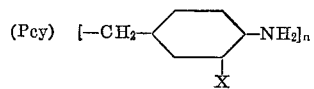

wherein Pcy represents a phthalocyanine dyestuff moiety, X represents H, sulfonic, or sulfamyl, and $n$ has a value of 1 to 4.

---

This invention is concerned with the provision of novel phthalocyanine compounds, and more particularly to the provision of novel substituted phthalocyanine compounds useful as dyestuffs and as intermediates for the production of azo dyestuffs, fiber-reactive dyestuffs and the like.

Dyestuffs containing a phthalocyanine residue, and the numerous advantages of such dyestuffs attributable to the presence of such residue, are well known. It is an object of the present invention to provide a phthalocyanine compound containing a novel substituent whereby the substituted compound is useful as a dyestuff per se and/or as an intermediate readily useful for synthesizing azo dyestuffs, dyestuffs containing any one of the many known fiber-reactive and/or chromophoric groups and the like. Other objects and advantages will appear as the description proceeds.

The attainment of the above objects is made possible by the present invention which is based upon the provision of a compound of the following formula and novel methods for producing same:

(I)        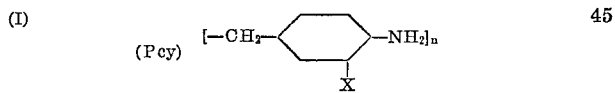

wherein Pcy represents a dyestuff moiety of the phthalocyanine series, X represents —H, —SO$_3$H or

R$^1$ and R$^2$ represent H, aryl or lower alkyl or, together with the N atom, the atoms necessary to complete a 5 or 6 membered heterocycle, and $n$ has an average value of 1 to 4.

As employed in the above formula and hereinafter, the terms Pcy, phthalocyanine dyestuff and/or dyestuff of the phthalocyanine series are inclusive of unmetallized phthalocyanine molecules, and metallized phthalocyanine molecules such as the preferred copper, in addition to cobalt, aluminum, nickel, iron, zinc, vanadium, tin, magnesium, chromium, and other metal phthalocyanines. Whether metallized or unmetallized, such phthalocyanine molecule may be nuclearly substituted by one or more lower alkyl such as methyl or ethyl, halogen such as chlorine or bromine, phenyl, or water solubilizing groups such as sulfonic or carboxylic acid, or the like.

In the above structural Formula I, the bracketed portion is nuclearly bonded to the fundamental phthalocyanine nucleus, and one or more of the four benzene rings in such nucleus may be substituted by the bracketed group.

In the above Formula I, X represents H, SO$_3$H (including as equivalents its alkali metal, metal, alkaline earth metal, ammonium, and organic amine salts), or any of the following illustrative sulfonamido groups:

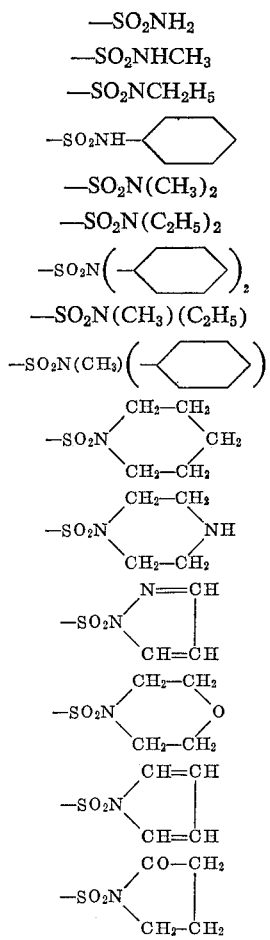

It will be understood that without departing from the spirit and scope of the present invention, there may be provided compounds equivalent to Formula I above wherein the bracketed benzene ring may be substituted in any of the vacant positions by lower alkyl such as methyl or ethyl, lower alkoxy, such as methoxy, or ethoxy, phenyl, or phenoxy, and that R$^1$ or R$^2$ values other than H may be substituted by similar lower alkyl, lower alkoxy, phenyl or phenoxy groups or by hydroxy, sulfonic, or carboxylic or the like.

In accordance with the present invention, compounds of the above Formula I wherein X is H may be prepared by reacting by heating at a temperature of about 140 to 200° C. and preferably about 170 to 190° C., a compound of the phthalocyanine series containing an average of 1 to 4 nuclearly substituted chloromethyl groups per molecule with, for each mole of said compound, 1 to 4 moles of an acylanilide, and then subjecting the resulting intermediate to the action of an acidic medium to hydrolyze the acylamino group to —NH$_2$. The reaction between the chloromethylated phthalocyanine and the acylanilide results in liberation of HCl and is therefore preferably carried out while removing the evolved HCl gas and/or under any known acid binding conditions and/or with the aid of an organic solvent medium which may at the same time serve as an acid binding medium such as dimethylformamide or N-methylpyrrolidone. The acylanilide may be nuclearly substituted by any inert group which does not interfer with the para-directing influence of the acylamino group, as for example any of the lower alkyl, lower alkoxy, phenyl or phenoxy groups referred to above, and the acyl radical therein may be any readily hydrolyzable group, preferably a lower alkanoyl group as derived for example from formic, acetic, or propionic acid or the like. When the phthalocyanine reactant contains more than one chloromethyl group, all or part of the additional chloromethyl groups may be converted to compounds of Formula I above by employing in the described reaction correspondingly increased molecular proportions of the acylanilide reactant. The acidic hydrolysis step may be carried out in any known manner as for example at elevated temperatures or under reflux in an aqueous solution of a mineral acid such as hydrochloric acid, sulfuric acid or the like. This reaction may be depicted by the following equation:

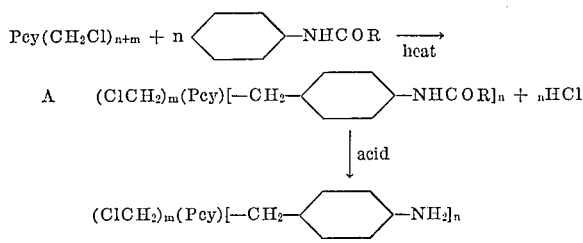

wherein Pcy and $n$ have the values given above, R is preferably H, $CH_3$ or $C_2H_5$, and $m$ is preferably 0 but may have a value of for example 1 to 4 or more.

Products with increased water solubility may be prepared by employing as the initial phthalocyanine reactant in the above described reaction a chloromethylated and sulfonated phthalocyanine, or by employing as the acidic hydrolyzing medium a sulfonating agent such as sulfuric acid of at least 96% concentration, including oleum preferably at elevated temperatures over about 30° C. This latter sulfonating reaction simultaneously hydrolyzes the acylamino group to —$NH_2$ and results in a sulfonated product of the above Formula I wherein X is —$SO_3H$.

Products of the above Formula I wherein X is

—$SO_2NR^1R^2$ may be prepared from the acylamino-containing intermediate of Formula A in Equation II above by chlorosulfonation in known manner with chlorosulfonic acid to yield a compound of Formula I above wherein X is —$SO_2Cl$, and then reacting the resulting chlorosulfonated compound with ammonia or a primary or secondary amine of the formula $HNR^1R^2$ as for example mono- or di-methyl-, -ethyl-, or -phenyl-amine, methylethylamine, methylphenylamine, piperidine, piperazine, pyrazole, morpholine, pyrrole, and 2-pyrrolidone.

The compounds of the present invention are green or blue-green dyestuffs which may be further employed as in the production of other types of dyestuffs. Thus, they may be diazotized and coupled in known manner with any of the known types of coupling components such as pyrazolones, e.g. 1-phenyl-3-methylpyrazolone-5, acyl-acetanilides, e.g. aceto, acetoanilide, and aromatic hydroxy compounds; e.g. H-, J-, K- and R-acids, 2-hydroxy-3-naphthoic acid and its anilide derivatives, resorcinol, naphthol, and the like. Such azo dyestuffs are substantive to cellulosic, wool, silk, and synthetic fibers such as polyacrylonitrile yielding bright green or blue-green dyeings.

Additionally, the products of the present invention may be reacted with halo-containing anthraquinones such as for example bromamine acid to yield desirable anthraquinone dyestuffs. Further, the present products may be reacted with cyanuric acid and primary amino condensation products of cyanuric acid to yield fiber-reactive triazinylamino-containing dyestuffs, with acryloyl chloride to yield fiber-reactive acrylamide-containing dyestuffs, with monochloro- or polychloro-acryloyl chlorides to yield fiber-reactive chloroacrylamide-containing dyestuffs, and other known halo-containing polyfunctional compounds for the production of other fiber-reactive dyestuffs.

The following examples are only illustrative of the present invention and are not to be regarded as limitative. All parts and proportions referred to herein and in the appended claims are by weight unless otherwise indicated.

EXAMPLE 1

In a 1500-ml. beaker equipped with a stirrer and thermometer are placed 50 ml. dimethylformamide and 370 g. acetanilide. The mixture is heated on an electric hot plate to 130° C. with agitation. During one-half hour, 74 g. (0.1 mole) trischloromethyl copper phthalocyanine are gradually added at 125–130° C. with constant agitation. The temperature is then gradually increased to 150° C. during which time hydrogen chloride fumes begin to evolve. The temperature is again raised to 185–190° C. and held there one and one-half hours or until the evolution of hydrogen chloride fumes nearly ceases. The hot molten mixture is slowly poured into two liters of ethanol with rapid agitation. The insoluble mixture is filtered on a Buchner funnel and the wet cake is slurried in three liters of boiling water. The product is filtered again, washed with 8–10 liters of boiling water, dried in a vacuum oven at 70° C., and 107.5 g. of dried material having the following formula is obtained:

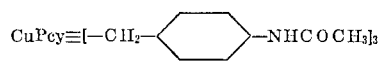

EXAMPLE 2

A one-liter three-neck flask equipped with a stirrer, thermometer and a condenser is charged with 21.6 g. 100% (0.02 mole) tris(4-acetylaminobenzyl) copper phthalocyanine (described in Example 1) as 63 g. wet paste, 400 ml. concentrated hydrochloric acid s.g. 1.189 and 200 ml. water. The mixture is refluxed for 5 hours and after hydrolysis is complete the mixture is cooled to room temperature, filtered and washed acid-free with cold water The hydrolyzed product has the formula:

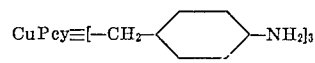

Diazotization of the above product with nitrous acid is performed and the diazo compound coupled with p-(3-methyl-5-oxo-2-pyrazolin-1-yl)benzenesulfonic acid sodium salt to give a green dyestuff substantive to cotton and with H-acid to give a cotton substantive pink dyestuff.

EXAMPLE 3

There is gradually added 85.9 g. of the product of Example 1, to 740 g. 10% oleum in a 800 ml. beaker equipped with a stirrer and thermometer. The addition is made during one hour at room temperature and the mixture is stirred over night at room temperature. The following morning, the temperature is slowly raised during one-half hour to 70–80° C. and held at this temperature for 3 hours. The temperature is then raised to 90° C. for 2 hours. After cooling to room temperature, the reaction mixture is drowned into about 3 liters of ice and water. The precipitated copper phthalocyanine derivative is filtered at 0–5° C. in a Buchner funnel and the cake washed with 2 liters of ice water. The wet cake, weighing 528 g., is the result of both sulfonation and acetyl cleavage and is represented by the formula:

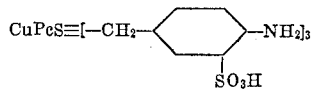

vention of Formula III containing substituents indicated in the table below.

(III)

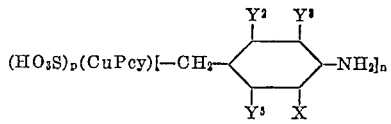

TABLE

| Example | P | Y² | Y¹ | Y³ | X | n |
|---|---|---|---|---|---|---|
| 5 | 1 | C₂H₅ | H | H | SO₂NHC₂H₅ | 1 |
| 6 | 0 | H | CH₃ | H | SO₃H | 4 |
| 7 | 0 | H | Phenyl | H | SO₂NH(sulfophenyl) | 2 |
| 8 | 1 | H | Phenoxy | H | SO₂N(CH₃)₂ | 2 |
| 9 | 1 | H | OCH₃ | CH₃ | SO₂NH(phenyl) | 3 |
| 10 | 0 | H | H | H | SO₂N(CH₂—CH₂)₂O | 2 |
| 11 | 1 | H | H | CH₃ | SO₂N(CH₂—CH₂)₂CO—CH₂ | 3 |

EXAMPLE 4

A 500 ml. three necked flask equipped with a stirrer, thermometer and a hydrogen chloride fume trap is charged with 160 ml. chlorosulfonic acid. During 20 minutes 48 g. of the product of Example 1 are added portion-wise to the chlorosulfonic acid at room temperature. Then 32 g. phosphorus pentachloride are gradually added during one-half hour. The temperature is gradually raised to 102° C. in thirty-five minutes, during which time hydrogen chloride fumes begin to evolve. The temperature is further increased to 125–130° C. during forty-five minutes and held at this temperature for 8 hours or until the evolution of hydrogen chloride fumes practically ceases. The reaction mixture is allowed to cool to room temperature and drowned in 2 liters of ice and water. The precipitated product is filtered on a Buchner funnel and the wet cake added portion-wise to a mixture of 2 liters of ice and water and 750 ml. concentrated ammonia (29%). The mixture is stirred over night, during which time it is allowed to warm to room temperature. The mixture is treated with 375 g. sodium chloride and heated to 82° C. for several hours for agglomeration of the particles to improve the filter form. The copper phthalocyanine derivative is filtered after cooling the mixture to room temperature. The wet cake, weighing 390 g., has the formula:

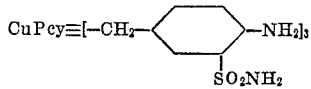

When the above product is diazotized and coupled with p - (3 - methyl - 5 - oxo - 2 - pyrazolin - 1 - yl)benzene-sulfonic acid, a direct dyestuff is obtained yielding on cotton bright green dyeings of excellent light-fastness.

Use of the appropriate sulfonated or unsulfonated chloromethylated phthalocyanine precursor, nuclearly substituted acylanilide, and/or organic amine reactant in the above described procedures yields products of the in-

We claim:
1. A compound of the formula

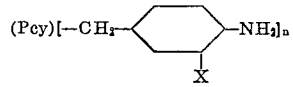

wherein Pcy represents an unsubstituted or nuclearly lower alkyl-, chloro-, bromo-, phenyl-, sulfonic-, or carboxylic-substituted metal or unmetallized phthalocyanine radical, X represents —H, —SO₃H or —SO₂NR¹R², R¹ and R² represent H, phenyl or lower alkyl or, together with the N atom, the atoms necessary to complete a piperidinyl, piperazinyl, pyrazolyl, morpholinyl, pyrrolyl, or pyrrolidonyl heterocycle, and $n$ has an average value of 1 to 4.

2. A compound as defined in claim 1 wherein Pcy represents copper phthalocyanine, and X is H.

3. A compound as defined in claim 1 wherein Pcy represents copper phthalocyanine, and X is —SO₃H.

4. A compound as defined in claim 1 wherein Pcy represents copper phthalocyanone, X represents

and R¹ and R² each represents H.

References Cited

UNITED STATES PATENTS 3,136,777  6/1964  Tobel _____ 260—314.5

FOREIGN PATENTS 827,569  2/1960  Great Britain.
853,364  11/1960  Great Britain.
868,746  5/1961  Great Britain.

HENRY R. JILES, Primary Examiner.

H. I. MOATZ, Assistant Examiner.

U.S. Cl. X.R.

260—147, 159, 242, 247.1, 249.5, 268, 293.4, 310

PO-1050
(5/69)

UNITED STATES PATENT OFFICE
CERTIFICATE OF CORRECTION

Patent No. 3,436,400          Dated   April 1, 1969

Inventor(s)  HARLAN B. FREYERMUTH ET AL

It is certified that error appears in the above-identified patent and that said Letters Patent are hereby corrected as shown below:

Column 2, line 11, "$-SO_2NCH_2H_5$" should read -- $-SO_2NHC_2H_5$. Column 5, line 6, that portion of the formula reading CuPcS        should read        CuPcy

SIGNED AND
SEALED

AUG 26 1969

(SEAL)
Attest:

Edward M. Fletcher, Jr.
Attesting Officer

WILLIAM E. SCHUYLER, JR.
Commissioner of Patents